US012618445B2

(12) United States Patent (10) Patent No.: US 12,618,445 B2
Marx et al. (45) Date of Patent: May 5, 2026

(54) METHOD AND DEVICE FOR DETERMINING THE WEAR OF A BRAKE

(71) Applicant: ZF Active Safety GmbH, Koblenz (DE)

(72) Inventors: Andreas Marx, Hartenfels (DE); Nicholas Alford, Waldesch (DE)

(73) Assignee: ZF Active Safety Gmbh, Koblenz (DE)

( * ) Notice: Subject to any disclaimer, the term of this patent is extended or adjusted under 35 U.S.C. 154(b) by 133 days.

(21) Appl. No.: 18/363,280

(22) Filed: Aug. 1, 2023

(65) Prior Publication Data

US 2024/0052902 A1    Feb. 15, 2024

(30) Foreign Application Priority Data

Aug. 12, 2022    (DE) .......................... 102022120404.9

(51) Int. Cl.
*B60T 17/22* (2006.01)
*F16D 66/02* (2006.01)

(52) U.S. Cl.
CPC .......... *F16D 66/023* (2013.01); *B60T 17/221* (2013.01)

(58) Field of Classification Search
CPC .... F16D 66/023; F16D 66/026; F16D 55/226; F16D 66/022; B60T 17/221; B60T 17/22
See application file for complete search history.

(56) References Cited

U.S. PATENT DOCUMENTS

2005/0040703 A1*    2/2005    Baumgartner ........ F16D 65/567
303/155

FOREIGN PATENT DOCUMENTS

| CN | 102774373 | A | * | 7/2012 | |
| CN | 108343692 | B | * | 2/2018 | ........... F16D 66/026 |
| CN | 109029233 | A | * | 8/2018 | ............... G01B 7/06 |
| DE | 102010063353 | A1 | | 6/2012 | |
| DE | 102012017961 | A1 | * | 9/2012 | ........... F16D 66/028 |
| DE | 102014212594 | A1 | * | 6/2014 | ........... B60T 17/221 |
| DE | 102021002486 | A1 | | 7/2021 | |
| EP | 3460383 | A1 | * | 9/2018 | ............... G01B 5/06 |

* cited by examiner

*Primary Examiner* — Steven Lim
(74) *Attorney, Agent, or Firm* — Kristin L. Murphy

(57) ABSTRACT

The disclosure relates to a method for determining the wear of a brake of a motor vehicle having a brake piston, an actuator, a first brake lining, a second brake lining, a friction partner and a mounting, where the brake piston is held on a spindle of the brake and can be moved axially along the spindle between the actuator and the friction partner.

10 Claims, 3 Drawing Sheets

METHOD AND DEVICE FOR DETERMINING THE WEAR OF A BRAKE

CROSS-REFERENCE TO RELATED APPLICATION

This application claims priority to German Priority Application No. 102022120404.9, filed Aug. 12, 2022, the disclosure of which is incorporated herein by reference in its entirety.

TECHNICAL FIELD

The disclosure relates to a method and a device for determining the wear of a brake, and to a motor vehicle with a plurality of brakes, wherein each of the plurality of brakes is provided with the device according to the disclosure.

BACKGROUND

It is known to subject the brake linings of conventional electrohydraulic brake systems of motor vehicles to a check in terms of the wear. The brake linings are thus provided with a plurality of electrical contacts embedded in different layers of the respective brake lining. The electrical contacts are gradually removed or destroyed with progressive abrasion of the brake linings. The driver of the motor vehicle is informed about the degree of wear of the brake disc by the absence of electrical signals, communicated to the bus system of the motor vehicle and detected, which occurs in this case.

The generic document DE 10 2014 212 594 A1 relates to a method for identifying the wear of a brake system. First, an assembled brake lining and an adjustment mechanism for tensioning the brake linings against a friction partner are provided. The brake lining is moved towards a fixed point, its displaced position being established. The brake lining is then moved towards a measurement point of the associated friction partner at which the brake lining rests directly on the friction partner or has reached an end point. After the displaced position of the measurement point has been established, a current degree of brake lining wear is calculated which is derived from the established displaced positions of the fixed point and the measurement point. A brake system is furthermore provided which is designed to identify the wear of an assembled brake lining using the method.

However, the method known from the prior art has the disadvantage that only the wear of the brake lining is established and other components of the brake are not taken into account. This can cause problems in accurately detecting the wear and in evenly decelerating the vehicle because the motor vehicle becomes destabilized and possibly out of control during a braking procedure, such as in an emergency braking procedure.

SUMMARY

The disclosure relates to a method for determining the wear of a brake of a motor vehicle having a brake piston, an actuator, a first brake lining, a second brake lining, a friction partner, and a mounting, wherein the brake piston is held on a spindle of the brake and can be moved axially along the spindle between the actuator and the friction partner, the method comprising: moving the brake piston in the direction of the actuator until the brake piston is in contact with the actuator; determining a minimum spacing $S_0$ of the brake piston from the actuator in the state in which the actuator is acted upon by the brake piston; moving the brake piston in the direction of the friction partner until the friction partner is in contact with the brake piston and the mounting; determining a maximum spacing $S_3$ of the brake piston from the actuator in the state in which the friction partner is acted upon by the brake piston and the mounting; and establishing a thickness of the friction partner from the maximum spacing $S_3$ and the minimum spacing $S_0$.

The disclosure moreover relates to a device for determining the wear of a brake of a motor vehicle having a brake piston, an actuator, a first brake lining, a second brake lining, a friction partner, and a mounting, wherein the brake piston is held on a spindle of the brake and can be moved along the spindle between the actuator and the friction partner, the device comprising: a sensor which is adapted to determine a minimum spacing $S_0$, a maximum spacing $S_3$, a first average spacing $S_1$ and a second average spacing $S_2$, wherein the actuator is acted upon by the brake piston at the minimum spacing $S_0$, wherein the friction partner is acted upon by the brake piston and the mounting at the maximum spacing $S_3$, wherein the brake piston is acted upon by the brake linings at the first average spacing $S_1$ and the second average spacing $S_2$, wherein the device is adapted to establish a thickness of the friction partner from the maximum spacing $S_3$ and the minimum spacing $S_0$, and to determine the wear of the first brake lining and the second brake lining based on the minimum spacing $S_0$, the first average spacing $S_1$, and the second average spacing $S_2$.

The disclosure furthermore relates to a motor vehicle with a plurality of brakes, wherein each of the plurality of brakes is provided with the device according to the disclosure.

The friction partner can be a brake disc or brake drum. For instance, the friction partner can be a brake disc of a disc brake, for example a floating-caliper brake, or a brake drum of a drum brake. The friction partner can be a brake disc of a floating-caliper brake.

The thickness of the friction partner relates to its dimension with the smallest measurement. Thus, the thickness of the friction partner corresponds to the spacing between the two brake linings provided that the latter are resting against or contacting the friction partner. The thickness of the first brake lining and the second brake lining corresponds to the spacing between the brake piston and the friction partner or between the friction partner and the mounting, such as the housing, provided that the brake linings are resting against the friction partner or contacting the latter and the brake linings are applied directly to the brake piston or the mounting, such as the housing wall. The two brake linings can be designed as symmetrical with the same dimensions and arranged symmetrically with respect to the friction partner.

The brake is a wheel brake of a motor vehicle which can be designed as an electromechanical brake (EMB). The brake has a brake piston, an actuator, a first brake lining, a second brake lining, a friction partner, and a mounting. The brake piston is held on a spindle of the brake and can be moved along the spindle between the actuator and the friction partner. The first brake lining can be arranged on the brake piston in such a way that the first brake lining touches the friction partner during a deceleration of the motor vehicle. The second brake lining can be arranged on the mounting. In the case of a floating-caliper brake, the mounting can be designed as a housing of the floating-caliper brake, wherein, during a deceleration of the motor vehicle, the first brake lining touches the friction partner and shifts the latter until the friction partner also touches the second brake lining. In the case of a fixed-caliper brake, the mounting can be designed as a further brake piston, wherein the further brake piston is held on a further spindle of the brake and can be moved along the further spindle between a further actuator and the friction partner. When the brake is designed as a fixed-caliper brake, the motor vehicle is decelerated by both actuators being activated simultaneously and the two brake pistons consequently touching the friction partner simultaneously with the two brake linings.

In the method according to the disclosure, the brake piston is moved in the direction of the actuator until the brake piston touches the actuator. A minimum spacing $S_0$ of the brake piston from the actuator in the state in which the actuator is acted upon by the brake piston is determined here. The brake piston is then moved in the direction of the friction partner until the friction partner is in contact with the brake piston and the mounting. A maximum spacing $S_3$ of the brake piston from the actuator in the state in which the friction partner is acted upon by both the brake piston and the mounting is determined here. In another exemplary arrangement, the brake piston can first be moved in the direction of the friction partner and the maximum spacing $S_3$ determined and the brake piston then moved in the direction of the actuator and the minimum spacing $S_0$ determined. In both cases, the thickness of the friction partner is established from the maximum spacing $S_3$ and the minimum spacing $S_0$. The spacings $S_0$ and $S_3$ here represent only the displaced positions of the brake piston with reference to the brake when it is in contact with the actuator or is in contact with the friction partner (and contact of the friction partner with the mounting). The contact of the brake piston and the friction partner (and the contact of the friction partner with the mounting) requires that brake linings which may be present, for example worn or abraded brake linings, be removed in advance from the brake, such as from the brake piston and the mounting.

The thickness of the friction partner can be established from the maximum spacing $S_3$ and the minimum spacing $S_0$ in different ways. For example, the change in the spacing between a side of the brake piston which faces the actuator and a side of the actuator which faces away from the brake piston can be determined, for example via a travel sensor. Alternatively or additionally, the displacement of the brake piston can be established with the aid of an engine position sensor, an engine torque sensor, and possibly a brake force sensor. The thickness of the friction partner can be determined from the maximum spacing $S_3$ and the minimum spacing $S_0$. To do this, the known dimensions of the brake, such as the spacing between a side of the actuator which faces the friction partner and the mounting against which the friction partner rests when the spacing $S_3$ is determined, is determined, wherein the maximum spacing $S_3$ is also subtracted from this value.

The thickness of the friction partner can be determined simply as a result. With the first brake lining provided on the brake piston and the second brake lining provided on the mounting, the wear of the brake linings can be established precisely at different points in time during the operation of the motor vehicle on the basis of the decrease in the thickness of the brake linings. The brake linings can be replaced when required. In another exemplary arrangement, the settings of the brake piston can be adapted to the altered thickness of the brake linings in such a way that the same force is exerted on the respective brake linings for all wheel brakes of a motor vehicle. Even deceleration of the vehicle is consequently enabled by the driver themselves taking control of the motor vehicle in the case of emergency braking.

According to an exemplary arrangement, the method comprises the removal of the first brake lining and the second brake lining from the brake before the brake piston moves in the direction of the friction partner. The brake linings are, for example, used or worn brake linings which need to be replaced, such as with new ones, as part of a service. It is thus ensured that the thickness of the friction partner and possibly its degree of wear can be determined reliably. According to an exemplary arrangement, the method comprises moving the brake piston in order to bring the first brake lining and the second brake lining each into contact with the friction partner; determining a first average spacing $S_1$ of the brake piston from the actuator in the state in which the brake piston is acted upon by the brake linings; and establishing a thickness of the first brake lining and the second brake lining from the first average spacing $S_1$ and the minimum spacing $S_0$. These brake linings are generally brake linings which have a greater thickness than the worn brake linings. These brake linings can be as good as new or brand-new brake linings. An optimal braking effect of the brake is consequently provided or restored. The initial thickness of the two brake linings (possibly as the sum of the thickness of the first brake lining and the thickness of the second brake lining) can furthermore be established therefrom with the aid of the first average spacing $S_1$ and the minimum spacing $S_0$. The initial thickness of the two brake linings is also established, like the determination of the spacing $S_3$, such as part of a service. The removal of the first brake lining and the second brake lining from the brake can take place before moving the brake piston. As mentioned above, the brake linings to be removed can be worn brake linings which are replaced, for example, as part of a service.

According to an exemplary arrangement, the method comprises moving the brake piston again in order to bring the first brake lining and the second brake lining in each case into contact with the friction partner; determining a second average spacing $S_2$ of the brake piston from the actuator in the state in which the brake piston is acted upon again by the brake linings; determining the wear of the first brake lining and the second brake lining based on the minimum spacing $S_0$, the first average spacing $S_1$, and the second average spacing $S_2$. The second average spacing $S_2$ can be determined as part of the operation of the motor vehicle, such as once the service is completed. The operation of the motor vehicle requires occasional activation of the brake which in turn is accompanied with wear, and an accompanying decreasing thickness, of the brake linings. The initial thickness of the brake linings can be established, for example, as part of a service or with the aid of the vehicle electronics, such as a control device, wherein one or more of the abovementioned sensors is or are used. The displacement of the brake piston can thus be established precisely with the aid of one or more of a travel sensor, an engine position sensor, an engine torque sensor, and possibly a braking force sensor. The wear of the brake linings and possibly the friction partner can thus also be established as part of the normal use of the motor vehicle and therefore not during a service. It is, however, here to be assumed that wear of the friction partner is negligible and is not taken into account in terms of the wear of the brake linings during the operation of the motor vehicle and until the spacing $S_1$ is determined again, for example as part of another service.

According to an exemplary arrangement, the steps of moving again, determining a second average spacing $S_2$, and determining wear are performed when the motor vehicle is stationary. The steps of moving again, determining a second average spacing $S_2$, and determining wear are performed each time the motor vehicle is stationary. The vehicle electronics, such as the control device, can be adapted to determine the thickness of the brake linings individually for each wheel brake of the motor vehicle and to activate the actuator of each wheel brake in such a way that, in the case of a different amount of wear of the wheel brakes which may occur, an adaptation of the setting of the actuators can be made such that a uniform braking force is achieved for all wheel brakes. A reliable and even braking effect can thus be achieved even after relatively long use of the motor vehicle without there being any need for a service to be involved.

According to an exemplary arrangement, the method comprises providing a warning signal when the thickness of the first brake lining and the second brake lining falls below a predetermined threshold value. For example, the vehicle electronics, such as the control device, can be adapted to provide an acoustic and/or optical warning signal to the driver when the thickness of the brake linings falls below a determined minimum value. The driver is consequently able to replace the brake linings or have them replaced.

According to an exemplary arrangement, the method comprises setting a predetermined spacing between the first brake lining and the friction partner, such as after the thickness of the first brake lining and the second brake lining has been established. The predetermined spacing is the so-called play. As used in this document, this is the average spacing between the brake linings and the friction partner. The play can be chosen freely but is generally high enough to avoid undesired brake drag at the brake surfaces and low enough to obtain a short-term braking effect. Exemplary values of the play comprise 0.15 to 0.50 mm, such as, for example, 0.2 to 0.4 mm, or 0.3 mm. In the case of a floating-caliper brake, a predetermined spacing of 0.6 mm can be set, for example, in the case of a desired play of 0.3 mm. During the subsequent operation of the motor vehicle, the friction partner is displaced by one or more braking procedures in such a way that the spacing from the friction partner to the first and the second brake lining is in each case on average 0.3 mm.

According to an exemplary arrangement, the actuator comprises an electric motor with a transmission and a control unit, wherein the control unit is adapted to determine the minimum spacing $S_0$, the first average spacing $S_1$, the second average spacing $S_2$ and the maximum spacing $S_3$ and optionally communicate them to vehicle electronics. It is consequently ensured that the thickness of the brake linings and hence their wear can also be determined reliably during the operation of the motor vehicle. A desired play can furthermore readily be set.

The vehicle electronics, such as the control device, are adapted to activate the electric motor via the control unit and to record, on the basis of the minimum spacing $S_0$, the first average spacing $S_1$ and the maximum spacing $S_3$, the thickness of the friction partner from the maximum spacing $S_3$ and the minimum spacing $S_0$, and to determine the wear of the friction partner and the brake linings from the minimum spacing $S_0$ and the first average spacing $S_1$.

The vehicle electronics, such as the control device, can provide corresponding driving and braking assistance functions. These driving and braking assistance functions are used, inter alia, for autonomous or semi-autonomous driving and also in the case of heavy braking procedures.

The disclosure furthermore relates to a computer program product with a program code for performing the method according to the disclosure. The vehicle electronics, such as the control device, can be adapted to execute the computer program product.

The brake or wheel brake can be a constituent part of a brake system of a motor vehicle. The brake system can be an integrated brake system. An integrated brake system is a structural unit which combines a large number of functions in a compact structure.

BRIEF DESCRIPTION OF DRAWINGS

The disclosure is subsequently explained by way of example and in detail on the basis of several Figures, in which.

DETAILED DESCRIPTION

The same objects, functional units and comparable components are designated by the same reference signs in all the Figures. These objects, functional units and comparable components are configured identically in terms of their technical features unless something different is stated explicitly or implicitly in the description.

Figure 1:
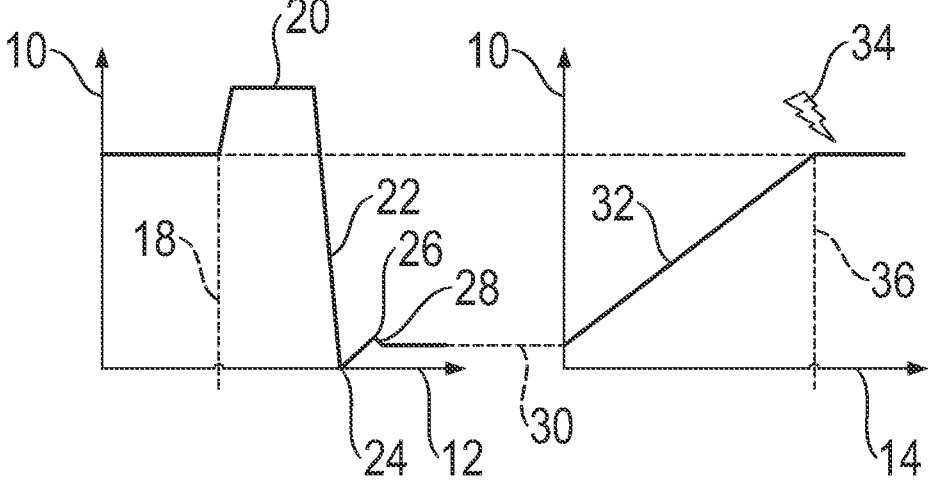
FIG. 1 shows a schematic diagram of the progression over time of a method for determining the wear of a brake.
Figure 2:
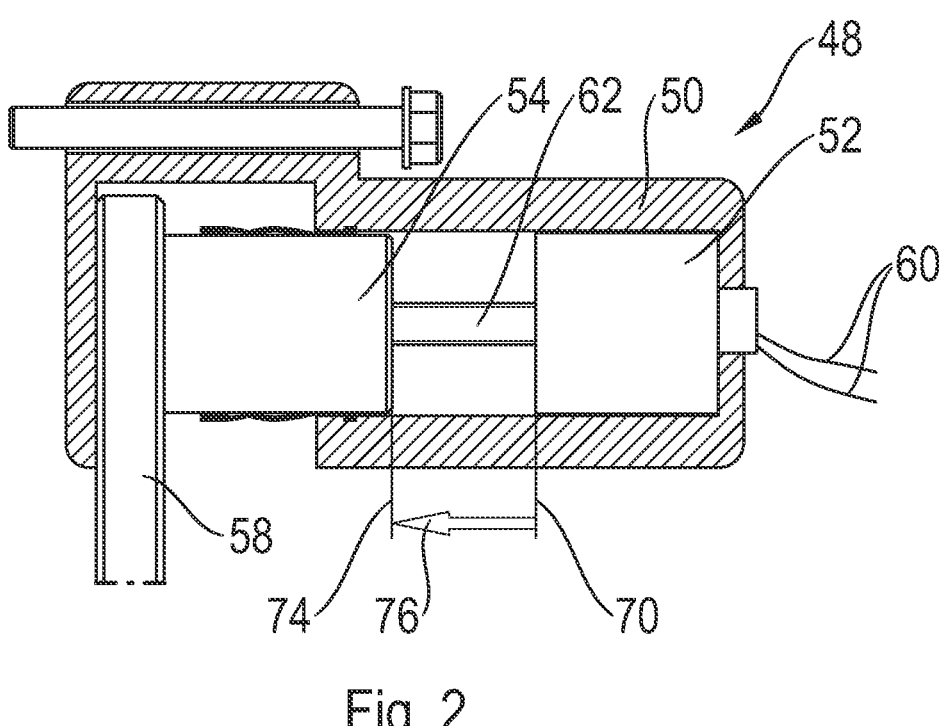
FIG. 2 shows a schematic view of a brake in which the brake piston contacts the brake disc.

FIG. 1 shows an exemplary and purely schematic diagram of the progression over time of a method for determining the wear of a brake 48 (see FIG. 2). The brake 48 or wheel brake is designed as an EMB floating-caliper brake and a constituent part of a brake system (not shown) of a motor vehicle. In the brake system, the brake 48 is present at each wheel of a motor vehicle and is connected electrically to a control device via connections 60. In the present case, the control device is purely by way of example and can be a control device (not shown) designed as a driving assistance system which, in conjunction with the drive unit (not shown) of the motor vehicle, provides activation of the brakes 48, inter alia on the basis of signals from sensors which are not shown here. The control device moreover provides corresponding driving and braking assistance functions which are used, inter alia, for autonomous or semi-autonomous driving and also in braking procedures.

The brake 48 here comprises, as can be seen, for example, from a schematic illustration thereof, an actuator 52 designed as an electric servo motor. The actuator 52 comprises a spindle 62 on which the brake piston 54 is held movably. The brake piston 54 can therefore be moved or displaced axially along the spindle 62 by an actuator 52. The electrical connection or transmission of signals between the actuator 52 and the control device is here enabled by a control unit (not shown) of the servo motor. The brake 48 moreover comprises a first brake lining 56a and second brake lining 56b which are arranged so they adjoin a friction partner 58 designed as a brake disc. The friction partner 58 is arranged between the second brake lining 56b, which is attached to a mounting 50, designed as a housing, of the brake 48 on a side of the friction partner 58 which faces away from the brake piston 54, and the first brake lining 56a which is attached to the brake piston 54 on a side of the friction partner 58 which faces the brake piston 54. This type of arrangement enables the brake piston 54 to be displaced in the direction of the friction partner 58 when the actuator

52 is actuated such that the brake linings 56a, b contact the friction partner 58 or come into frictional engagement with the friction partner 58 and brake its rotation.

As can be further seen in FIG. 1, the vertical axis 10 represents increasing distance of travel 72, 76, 82 of the brake piston 54, wherein the zero value here describes the state in which the actuator is acted upon by the brake piston 54. The horizontal axis 12 represents the time elapsed in seconds, wherein the horizontal axis 14 represents the time elapsed in months.

Initially, a motor vehicle is brought in for inspection, and a service 18 initiated which is designed to carry out the method according to the disclosure for determining the wear of a brake 48.

In the method for determining the wear of the brake 48, in a step 20 the brake piston 54 is moved in the direction of the friction partner 58 until the friction partner 58 touches the brake piston 54 and the mounting 50. To do this, as can be seen in a further schematic illustration of the brake 48 from FIG. 2, the brake piston 54 is moved to a maximum spacing $S_3$ 74 which characterizes a displaced position of the brake piston 54 in which the brake piston 54 contacts a first side of the friction partner 58, and a second side, opposite the first side, of the friction partner 58 contacts the mounting 50. The distance of travel by the brake piston 54 is thus at its maximum. For this purpose, the worn brake linings 56a, b are first removed.

In a further step 22, brand-new first and second brake linings 56a, b are attached to the brake piston 54 and the mounting 50, respectively. The state in which the new first and second brake linings 56a, b are attached in the brake 48 is shown schematically in FIG. 3. It can be seen that the second brake lining 56b is attached to the mounting 50 of the brake 48 on a side of the friction partner 58 which faces away from the brake piston 54, and the first brake lining 56a is attached to the brake piston 54 on a side of the friction partner 58 which faces the brake piston 54.

Figure 3:
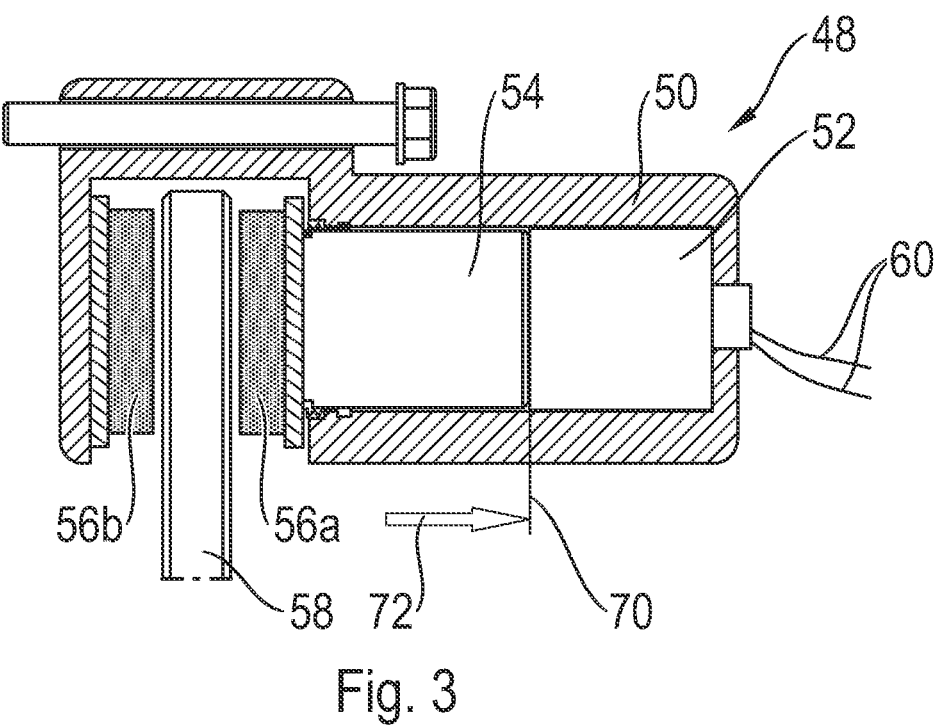
FIG. 3 shows a schematic view of a brake in which the brake piston contacts the actuator.

The brake piston 54, as can also be seen in FIG. 3, is then moved in a further step 24 to a minimum spacing $S_0$ 70 starting from the maximum spacing $S_3$ 74. The minimum spacing $S_0$ 70 here characterizes a displaced position of the brake piston 54 in which the brake piston 54 contacts the actuator 52.

As can be seen in FIG. 2, the brake piston 54 can therefore be moved between the minimum spacing $S_0$ 70 and the maximum spacing $S_3$ 74 by a distance of travel 76.

Figure 4:
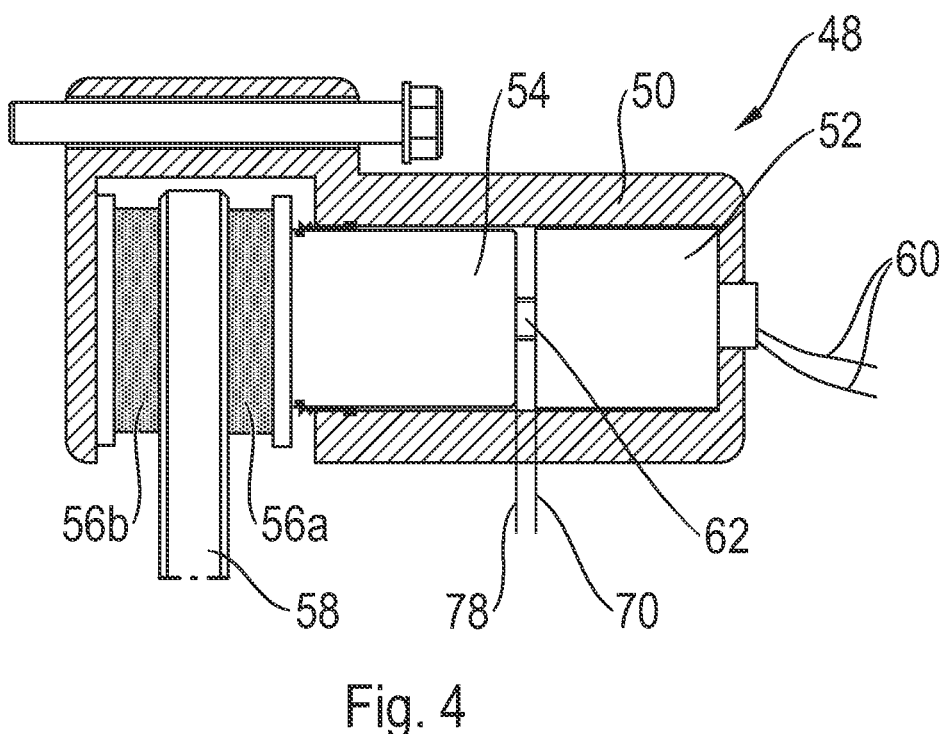
FIG. 4 shows a schematic view of a brake with unworn brake linings.

As can be seen in the schematic illustration in FIG. 4, the brake piston 54 is in a further step 26 maximally extended again in such a way that the brand-new second brake lining 56b which is provided on the mounting 50, and the brand-new first brake lining 56a which is provided on the brake piston 54, contact the friction partner 58 on both sides. In this state of the brake 48, the first average spacing $S_1$ 78 is determined.

The minimum spacing $S_0$ 70, the first average spacing $S_1$ 78 and the maximum spacing $S_3$ 74 are each communicated to the control device by the control unit. The control device for each individual brake 48 of the motor vehicle can subsequently record and store the initial thickness of the friction partner 58 and the brake linings 56a, b on the basis of the minimum spacing $S_0$ 70, the first average spacing $S_1$ 78 and the maximum spacing $S_3$ 74 and hence on the basis of the displaced positions of the brake piston 54.

In a further step 28, as shown schematically in FIG. 1, the brake piston 54 is retracted by a certain distance of 0.6 mm in order to enable a play (not shown) to be set with an average value of 0.3 mm between the brand-new brake linings 56a, b and the friction partner 58. This play is dimensioned such that the brake linings 56a, b, on the one hand, do not unnecessarily contact the friction partner 58 while the motor vehicle is being driven and, on the other hand, have such a small spacing from the friction partner 58 that when required braking can be initiated quickly. Because moreover the control device (not shown) activates each brake 48 of the motor vehicle in such a way they have the same play, uniform and controlled braking of the motor vehicle can also be effected when required. It is consequently avoided that the motor vehicle becomes destabilized and possibly out of control in the case of heavy braking, such as in the case of emergency braking.

The service 18 is then ended and the play set in step 28 with the average value of 0.3 mm between the brand-new brake linings 56a, b and the friction partner 58 maintained. This is indicated in FIG. 1 by the horizontal progression 30.

Regular operation of the motor vehicle over a long period of time can furthermore be seen in the diagram shown in FIG. 1 (see the diagram on the right in FIG. 1). The thickness of the brake linings 56a, b thus continuously decreases over time because of various braking procedures and the brake linings 56a, b become increasingly worn. This process is indicated in FIG. 1 by a rising phase 32 of the distance of travel of the brake piston 54 and corresponds to the increase in the distance of travel 82 by the brake piston 54 between the minimum spacing $S_0$ 70 at which the brake piston 54 contacts the actuator 52, and the second average spacing $S_2$ 80 at which the worn brake linings 56a, b, which have a smaller thickness than the brand-new brake linings 56a, b, contact the friction partner 58. In order to determine the second average spacing $S_2$, the brake piston 54 is here maximally extended again in order to bring the first brake lining 56a and the second brake lining 56b each into contact with the friction partner 58.

Figure 5:
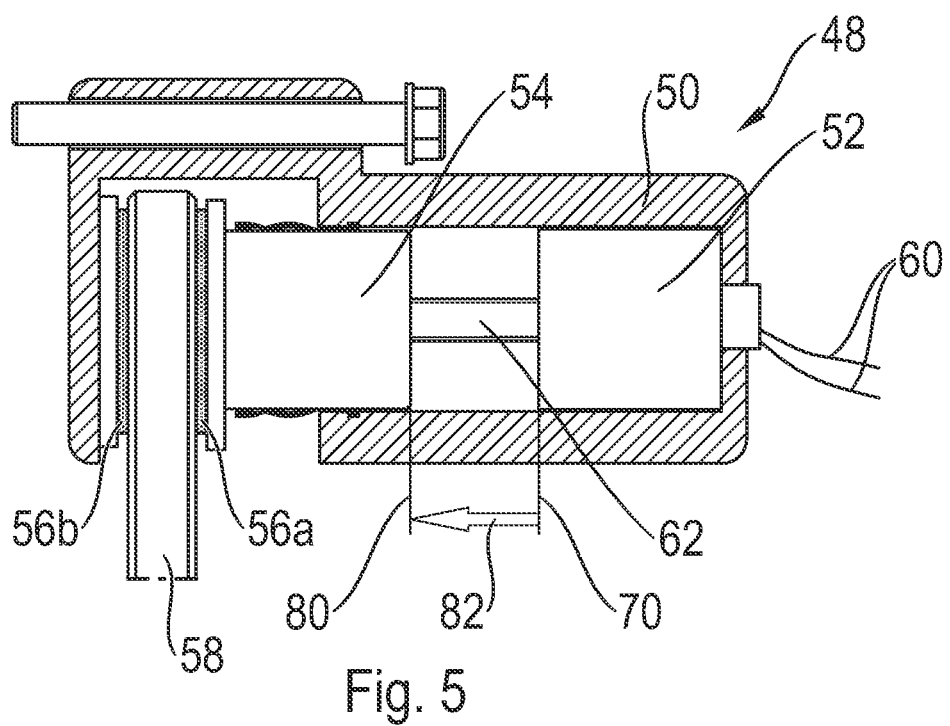
FIG. 5 shows a schematic view of a brake with worn brake linings.

As can be seen in the schematic illustration of the brake in FIG. 5, the degree of wear of the brake linings 56a, b which results during the rising phase 32 in FIG. 1 is represented by the length of the distance of travel 82 between the minimum spacing $S_0$ 70 and the second reduced spacing $S_2$ 80. These values are communicated to the control device which, by comparing the initial thickness of the brand-new brake linings 56a, b, establishes the wear of the latter and shows this to the driver.

If the distance of travel 82 and hence the wear of the brake linings 56a, b has reached a predetermined value, in this case a threshold value 34, the control device provides a warning signal 36 to the driver. The warning signal 36 indicates that a new check of the motor vehicle and the required change of the brake linings 56a, b and/or the friction partner 58 as part of a further service 18 are pending.

The invention claimed is:

1. A method for determining a wear of a brake of a motor vehicle having a brake piston, an actuator, a first brake lining, a second brake lining, a friction partner and a mounting, wherein the brake piston is held on a spindle of the brake and can be moved axially along the spindle between the actuator and the friction partner, the method comprising:

removing the first brake lining and the second brake lining from the brake;

moving the brake piston in the direction of the actuator until the brake piston comes into contact with the actuator;

determining a minimum spacing S0 of the brake piston from the actuator in a state in which the actuator is acted upon by the brake piston with the first brake lining and the second brake lining removed;

moving the brake piston in the direction of the friction partner until the friction partner is in contact with the brake piston and the mounting;

determining a maximum spacing S3 of the brake piston from the actuator in a further state in which the friction partner is acted upon by the brake piston and the mounting with the first brake lining and the second brake lining removed; and establishing a thickness of the friction partner from the maximum spacing S3 and the minimum spacing S0.

2. The method according to claim 1, moreover comprising removal of the first brake lining and the second brake lining from the brake before the brake piston moves in the direction of the friction partner.

3. The method according to claim 1, moreover comprising moving the brake piston in order to bring the first brake lining and the second brake lining each into contact with the friction partner;

determining a first average spacing S1 of the brake piston from the actuator in the state in which the brake piston is acted upon by the brake linings; and establishing a thickness of the first brake lining and the second brake lining from the first average spacing S1 and the minimum spacing S0.

4. The method according to claim 3, moreover comprising:

moving the brake piston again in order to bring the first brake lining and the second brake lining in each case into contact with the friction partner;

determining a second average spacing S2 of the brake piston from the actuator in the state in which the brake piston is acted upon again by the brake linings;

determining the wear of the first brake lining and the second brake lining based on the minimum spacing S0, the first average spacing S1, and the second average spacing S2.

5. The method according to claim 4, wherein the steps of moving again, determining a second average spacing S2, and determining the wear are performed when the motor vehicle is stationary.

6. The method according to claim 4, moreover comprising providing a warning signal when the thickness of the first brake lining and the second brake lining falls below a predetermined threshold value.

7. The method according to claim 4, moreover comprising setting a predetermined spacing between the first brake lining and the friction partner, preferably after the thickness of the first brake lining and the second brake lining has been established.

8. A device for determining a wear of a brake of a motor vehicle having a brake piston, an actuator, a first brake lining, a second brake lining, a friction partner and a mounting, wherein the brake piston is held on a spindle of the brake and can be moved axially along the spindle between the actuator and the friction partner, the device comprising:

a sensor which is adapted to determine a minimum spacing S0, a maximum spacing S3, a first average spacing S1 and a second average spacing S2, wherein the actuator is acted upon by the brake piston at the minimum spacing S0 with the first brake lining and the second brake lining removed, wherein the friction partner is acted upon by the brake piston and the mounting at the maximum spacing S3 with the first brake lining and the second brake lining removed, wherein the brake piston is acted upon by the brake linings at the first average spacing S1 and the second average spacing S2 with the first brake lining and the second brake lining installed, wherein the device is adapted to establish a thickness of the friction partner from the maximum spacing S3 and the minimum spacing S0, and to determine the wear of the first brake lining and the second brake lining based on the minimum spacing S0, the first average spacing S1, and the second average spacing S2.

9. The device according to claim 8, wherein the actuator comprises an electric motor with a transmission and a control unit, wherein the control unit is adapted to determine the minimum spacing S0, the first average spacing S1, the second average spacing S2 and the maximum spacing S3 and optionally communicate them to vehicle electronics.

10. A motor vehicle with a plurality of brakes, wherein each of the plurality of brakes is provided with the device according to claim 8.

* * * * *